United States Patent
Davy et al.

(10) Patent No.: US 9,183,558 B2
(45) Date of Patent: Nov. 10, 2015

(54) AUDIO/VIDEO COMPANION SCREEN SYSTEM AND METHOD

(71) Applicants: James K. Davy, Burbank, CA (US); Brian Kwan, Altadena, CA (US); David M. Jessen, Sherman Oaks, CA (US); James Madden, Simi Valley, CA (US)

(72) Inventors: James K. Davy, Burbank, CA (US); Brian Kwan, Altadena, CA (US); David M. Jessen, Sherman Oaks, CA (US); James Madden, Simi Valley, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 13/754,325

(22) Filed: Jan. 30, 2013

(65) Prior Publication Data

US 2014/0125866 A1  May 8, 2014

Related U.S. Application Data

(60) Provisional application No. 61/722,736, filed on Nov. 5, 2012.

(51) Int. Cl.
*H04N 5/445* (2011.01)
*H04N 7/173* (2011.01)
*G06Q 30/00* (2012.01)
*H04N 21/414* (2011.01)
*H04N 21/41* (2011.01)
(Continued)

(52) U.S. Cl.
CPC ............ *G06Q 30/00* (2013.01); *G06Q 30/0267* (2013.01); *H04N 21/4126* (2013.01); *H04N 21/41407* (2013.01); *H04N 21/41415* (2013.01); *H04N 21/4307* (2013.01); *H04N 21/4758* (2013.01); *H04N 21/8133* (2013.01)

(58) Field of Classification Search
CPC ............ H04N 21/4307; H04N 21/462; H04N 21/4622; H04N 21/4722; H04N 21/858; H04N 21/8545; H04N 21/8547; H04N 21/41415; H04N 21/4126
USPC ................ 348/51; 725/60–61, 133, 141, 153; 455/3.06
See application file for complete search history.

(56) References Cited

U.S. PATENT DOCUMENTS 5,796,351 A * 8/1998 Yabuki .......................... 340/10.6
6,169,498 B1 * 1/2001 King et al. ................. 340/686.1
(Continued)

FOREIGN PATENT DOCUMENTS

WO    WO 2011109903 A1 *  9/2011

OTHER PUBLICATIONS

Audible Magic Launches SmartSync System(TM) for Media SynchronizationTechnology Marketing Corporation. Marketwire, Incorporated, Jul. 20, 2011, [>press release< online], [retrieved on Aug. 25, 2013]. Retrieved from the Internet <URL: *> http://www.marketwire.com/press-release/audible-magic-launches-smartsync-system-for-media-synchronization-1540539.*

*Primary Examiner* — James R Sheleheda
(74) *Attorney, Agent, or Firm* — Sheppard Mullin Richter & Hampton LLP (57) ABSTRACT

Systems and methods disclosed herein include systems and methods for delivering secondary content to a plurality of portable devices, the secondary content comprising events synchronized to primary content, the process including delivering an application to a plurality of portable display devices, the application configured to execute events on the portable display devices; and causing the events executed on the portable display devices to be synchronized with primary content.

26 Claims, 6 Drawing Sheets

(51) Int. Cl.
*H04N 21/43* (2011.01)
*H04N 21/475* (2011.01)
*H04N 21/81* (2011.01)
*G06Q 30/02* (2012.01)

(56) References Cited

U.S. PATENT DOCUMENTS

| | | | |
|---|---|---|---|
| 6,193,610 B1* | 2/2001 | Junkin | 463/40 |
| 7,358,959 B2* | 4/2008 | Fitzsimmons, Jr. | 345/169 |
| 7,881,713 B2* | 2/2011 | Hale et al. | 455/422.1 |
| 2002/0101537 A1* | 8/2002 | Basson et al. | 348/465 |
| 2002/0142842 A1* | 10/2002 | Easley et al. | 463/42 |
| 2004/0158865 A1* | 8/2004 | Kubler et al. | 725/82 |
| 2005/0227614 A1* | 10/2005 | Hosking et al. | 455/3.06 |
| 2007/0015531 A1* | 1/2007 | Disalvo | 455/550.1 |
| 2007/0274685 A1* | 11/2007 | Hale et al. | 386/97 |
| 2010/0267448 A1* | 10/2010 | Snoddy et al. | 463/30 |
| 2010/0293598 A1* | 11/2010 | Collart et al. | 726/3 |
| 2011/0103763 A1* | 5/2011 | Tse et al. | 386/201 |
| 2011/0195790 A1* | 8/2011 | Konkle | 463/42 |
| 2012/0064874 A1* | 3/2012 | Pierce et al. | 455/418 |
| 2012/0077595 A1* | 3/2012 | Cisneros et al. | 463/42 |
| 2012/0157177 A1* | 6/2012 | Hughes et al. | 463/9 |
| 2013/0036200 A1* | 2/2013 | Roberts et al. | 709/219 |
| 2013/0038702 A1* | 2/2013 | Schweitzer et al. | 348/51 |
| 2013/0167173 A1* | 6/2013 | Davis et al. | 725/37 |
| 2013/0183021 A1* | 7/2013 | Osman | 386/239 |
| 2013/0203480 A1* | 8/2013 | DeYoung | 463/23 |
| 2013/0244708 A1* | 9/2013 | Andrus et al. | 455/466 |
| 2014/0033239 A1* | 1/2014 | Wang et al. | 725/13 |
| 2014/0125866 A1* | 5/2014 | Davy et al. | 348/462 |
| 2014/0214920 A1* | 7/2014 | Wong et al. | 709/203 |

* cited by examiner

AUDIO/VIDEO COMPANION SCREEN SYSTEM AND METHOD

CROSS REFERENCE TO RELATED APPLICATIONS

This application claims the benefit of U.S. Provisional Application No. 61/722,736, which was filed on Nov. 5, 2012, and which is hereby incorporated herein by reference in its entirety.

TECHNICAL FIELD

The present disclosure relates generally to audio/video content, and more particularly, some embodiments relate to systems and methods for augmenting audio and video content with companion screen content. Even more particularly, some embodiments relate to systems and methods for providing companion events and content to accompany theatrical content.

DESCRIPTION OF THE RELATED ART

The conventional movie-going experience has evolved over time, but that evolution has been slow. While there have been vast improvements in animation, 3D and special effects, changes to the in-theater experience have not been as dramatic. Recent improvements to the in-theater experience have included things like the proliferation of larger screens, the addition of D-Box® seating, and the appearance of high-end luxury cinemas.

One addition to the in-theater experience is the introduction of the 4D movie experience. This 'next wave' of in-theater experiences promises other sensory stimulation to accompany the audio/visual movie content such as smells, tactile feedback, wind and mists. For example, to accompany the sneeze of an actor, nozzles can be used to spray a mist of water at the audience members. Likewise, to accompany a scene shot in a field of flowers, flower scents can be used to add to the immersive effect. While the 4D experience is not new, its introduction into mass-market cinemas is. Historically, 4D content has been limited to theme parks and the like. More recently, 5D experience has been initiated combining the 4D effects such as those described above, with moving seats.

The implementation of such 4D or 5D movie experiences requires physical infrastructure to provide the additional sensory stimulation, which itself can require a significant capital investment. Implementing these technologies in existing theaters typically requires retrofitting the existing theater. Accordingly, these enhanced experiences generally require a higher ticket price just to recoup the investment.

BRIEF SUMMARY

According to various embodiments, systems and methods described herein provide a plurality of users with secondary content to accompany primary program content. For example, in some embodiments, systems and methods are provided to download an application program onto client devices, including portable client devices such as, for example, an iPad®, tablet computer, iPhone®, Kindle®, Android® device, or other like tablet, smart phone or computing device. The application is one that provides secondary content that at least in part corresponds to, or is designed to accompany, the primary content. Preferably, various embodiments provide a method to initiate the application and synchronize the application with the primary program content. Accordingly, the application can provide secondary program content, synchronized or otherwise, to accompany the primary program content.

For example, in one embodiment, the systems and methods described herein can be provided and applied to enhance the movie-going experience. As a further example, in one embodiment, a process is provided for delivering secondary content to a plurality of portable devices, where the secondary content comprises events synchronized to a motion picture being shown in a movie theater. The events may, in some embodiments, interact with, accompany or otherwise correspond to the storyline of the motion picture. In various embodiments, the process includes displaying motion picture content to a viewer on a screen in the motion picture theater; delivering an application to a plurality of portable display devices, the application configured to execute events on the portable display devices, wherein the events comprise content to be displayed on the portable display devices; and causing the events executed on the portable display devices to be synchronized with the motion picture content. The delivering may be accomplished by communicatively coupling a server with the plurality of portable display devices and downloading the application from the server to the coupled portable display devices.

The events may, in some embodiments, include games or contests and the content displayed comprises one or more interactive screens to present the game or contest to the viewers. The events can include interactive content provided to the viewer and configured to capture viewer input. Accordingly, the process may be further configured to comprise receiving data indicative of viewer input and to determine viewer performance based on the data. In various embodiments, the process can further include ranking user performance for one or more events and sending results of the ranking to the portable display devices.

In another embodiment, a system for delivering secondary content to a plurality of secondary content display devices in a motion picture theater is provided. The system can include a primary content display device; a primary content delivery device configured to cause a motion picture to be shown on the primary content display device; and an application server configured to provide an application to the plurality of secondary content display devices, the application configured to execute events on the secondary content display devices, wherein the events comprise content to be displayed on the portable display devices, and wherein one of the primary content delivery device and application server are further configured to synchronize the events executed on the portable display devices with the motion picture content.

In various embodiments, the synchronizing can include transmitting a synchronization signal to the portable display devices, and the synchronization signal may include an audio signal.

In still further embodiments, a process for providing event content delivery, includes receiving an application at a portable display device; synchronizing the application to the motion picture; upon the occurrence of a predetermined trigger in the motion picture, executing the application to initiate an event in the portable display device, wherein the event comprises content to be displayed on the portable display device. The events may include games, and the content displayed comprises one or more interactive gaming screens to present the game to the viewers. The events may further include interactive content capturing viewer input, and wherein the process further comprises receiving data indicative of viewer input and determining viewer performance based on the data.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

The systems and methods described herein provide a plurality of users with secondary content to accompany primary program content. For example, in some embodiments, systems and methods are provided to download an application program onto client devices, including portable client devices such as, for example, an iPad®, tablet computer, iPhone®, Kindle®, Android® device, or other like tablet, smart phone or computing device. The application is one that provides secondary content that at least in part corresponds to, or is designed to accompany, the primary content. Preferably, various embodiments provide a method to initiate the application and synchronize the application with the primary program content. Accordingly, the application can provide secondary program content, synchronized or otherwise, to accompany the primary program content.

For example, in one embodiment, the systems and methods described herein can be provided and applied to enhance the movie-going experience. Further in light of this example, primary program content can be provided in the form of a motion picture such as, for example, a full-length feature film; although other types of video or audio/video content can serve as the primary content. In this example environment, the primary program content is presented to the audience members (sometimes referred to in this example as viewers) on the main screen, which is preferably the conventional movie screen at the front of the theater. The application loaded onto the viewers' client devices can be configured to provide secondary content to the audience members; the secondary content accompanying, and in some cases corresponding to, the motion picture being displayed on the main screen.

Continuing with this example, the client application executing on the client devices is synchronized to the motion picture on the main screen such that secondary content can be synchronized with, and in some embodiments triggered by, events in the motion picture. For example, the movie can be tagged with semaphores, flags or other data to trigger certain aspects or subroutines of the application. This can be correlated, in various embodiments, through a central server that receives the tags from the movie content and signals the user devices to execute the corresponding subroutine in the client application.

In other embodiments, other synchronization techniques can be used such as, for example, audio synchronization, synchronized start with elapsed time measurement, or other synchronization techniques. Accordingly, the system can be configured such that a particular event in the movie can trigger a corresponding activity or event on the user devices. Alternatively, the system can be provided such that a central server or other computing device controls the primary content and the client applications to maintain synchronization.

Still continuing with the example environment of a movie theater, in some embodiments the corresponding events or activities can include events such as, for example, games themed to correspond with the contemporaneous movie scene; trivia or quiz contests based on events in the movie; polls requesting that the audience members vote for favorite characters, optional endings or other scenes, and the like; accompanying lyrics provided to allow the audience members to sign along with songs in the movie; and other events and activities to involve the movie-going audience in the movie. In further embodiments, the events can involve providing content to use the screen of the client device as a duplication or an extension of the main movie screen.

For example, duplicate audio and video content can be provided on the client device to allow the client device to serve as a secondary viewing platform for the primary content, for example for the visually or hearing impaired.

As another example, where the client device is an extension of the main movie screen, video events may be constructed to 'flow' from the main screen to the screens on the client devices. As an illustrative example, graphics used for the events on the secondary display devices can originate on the primary content display and can be configured to flow or move down the primary content display device 126 onto the screens of the secondary display devices 122. As a further example, a virtual implement used in a gaming event (such as a spinning wheel in a game of chance, a paintbrush in a drawing game, or a weapon in a battle game) can be made to appear first on the primary content display device 126 and to be scrolled down onto appropriate ones of the secondary display devices 122.

Having thus provided a high-level description of the systems and methods in terms of the example environment of a movie theater experience, the systems and methods are now described in greater detail. For ease of description, the systems and methods are still described herein from time to time in terms of this exemplary in-theater environment; however, after reading this description, one of ordinary skill in the art will understand how these systems and methods can be applied in environments other than the movie theater.

Figure 1:
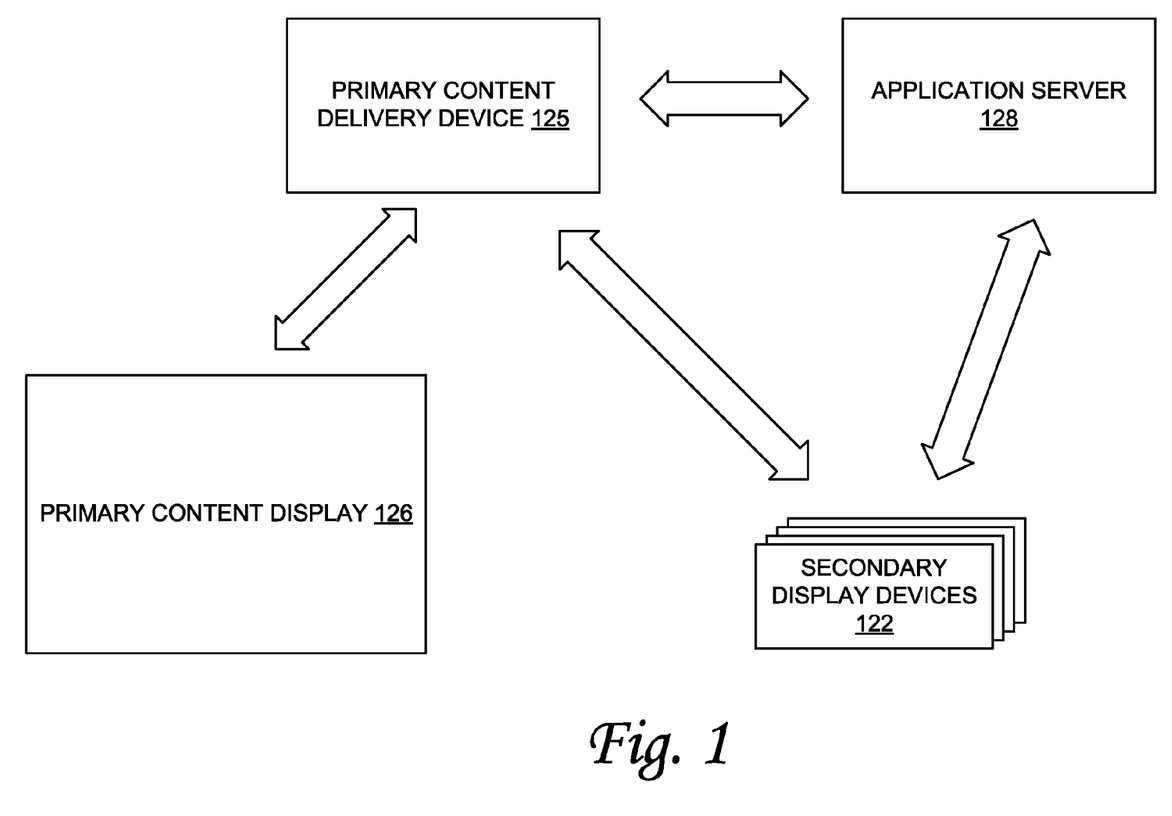
FIG. 1 is a block diagram illustrating a system for providing secondary program content in accordance with one embodiment of the systems and methods described herein.

FIG. 1 is a block diagram illustrating a system for providing secondary program content in accordance with one embodiment of the systems and methods described herein. The system in FIG. 1 includes an application server 128, a primary content delivery device 125, a primary content display device 126, and a plurality of secondary display devices 122. As depicted by the arrows in the illustrations, application server 128, primary content delivery device 125, primary content display device 126, and secondary display devices 122 are in communicative contact with one or more other components in this example.

Primary content delivery device 125 can include, for example, a content delivery device configured to provide or play audio/video content to one or more users or viewers. Primary content display device 126 is a display device that displays the video content to the users. In some embodiments, primary content display device 126 is integrated with primary content delivery device 125, while in other embodiments, they are separate devices. For example, in terms of the in-theater environment described above, primary content delivery device 125 can include a motion picture projection system. Such a motion picture projection system can be configured to project a motion picture onto a movie screen and to provide the soundtrack or other audio content accompanying the movie. Accordingly, primary content display device 126 can include a movie screen onto which the motion picture is projected by primary content delivery device 125.

Secondary display devices 122 can be fixed or portable devices. Secondary display devices 122 can include, for example, a plurality of client or user devices such as iPads, tablet computers, iPhones, Kindles, Android devices, or other like tablet, smart phone or computing devices. Preferably, secondary display devices 122 are selected with a sufficiently large display area to allow suitable viewing of secondary content or to allow sufficient touch-screen area for game play. Accordingly, iPad and tablet devices, may be preferable to smart phones or other smaller-screen devices, depending on the intended applications.

Application server 128 can include a computing system with wired or wireless communication interfaces to communicate with one or more of primary content delivery device 125, primary content display device 126, and secondary display devices 122. Application server 128 can be implemented, for example, as a computing system using the Windows®, Apple®, Unix®, Linux®, MacOS, or other operating system. In various embodiments, communications with secondary display devices 122 are all wireless communications so that the users can enjoy an untethered experience.

Although communication links are illustrated in the example system of FIG. 1 as being provided between primary content delivery device 125, application server 128 and secondary display devices 122, other communication configurations are possible. For example, in some embodiments, the program content running on primary content delivery device 125 can be pre-configured and does not require real-time interaction via a network or other communication link. That is, the program content can be configured to be shown without change or interruption to the program. Accordingly, in such embodiments a communication interface is not required between primary content delivery device 125 and application server 128 or secondary display devices 122. Instead, the primary and secondary program content can be synchronized and set to run.

Figure 2:
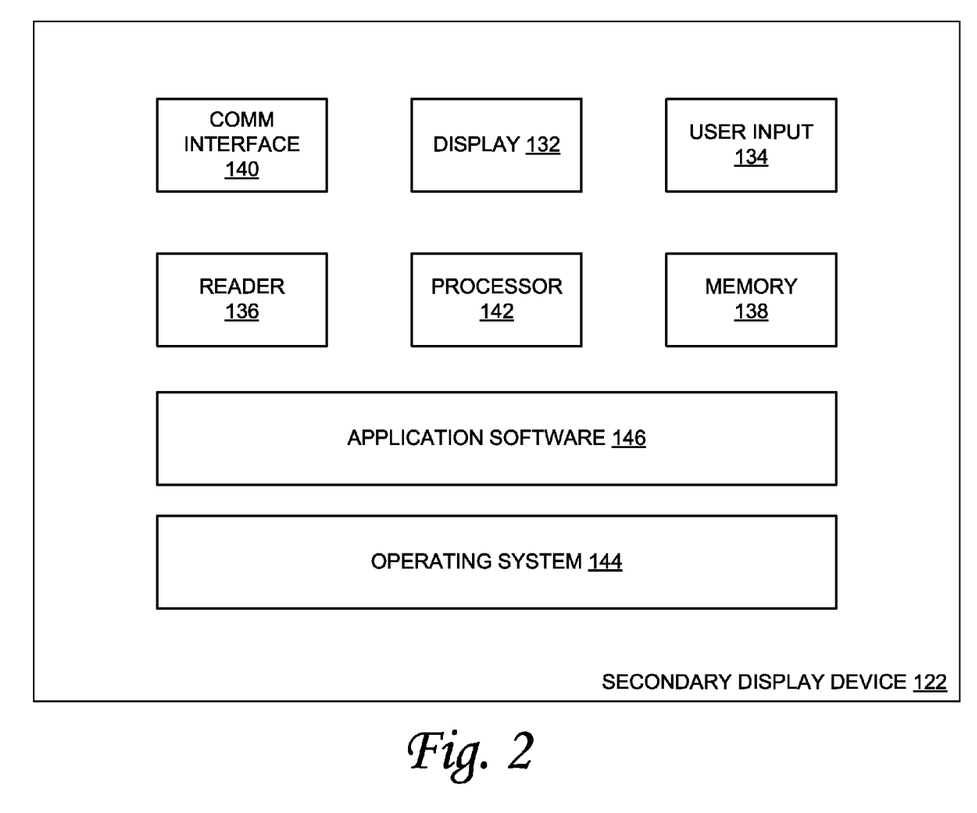
FIG. 2 is a diagram illustrating a detailed view of one example of a secondary display device in accordance with one embodiment of the systems and methods described herein.

Turning now to FIG. 2, a detailed view of one example of a secondary display device 122 is provided. As noted above, secondary display devices 122 may take various forms, including iPads, tablet computers, iPhones, Kindles, Android devices, or other like tablet, smart phone or computing devices. Accordingly, the secondary display device 122 may include operating system software 144. The operating system software 144 may be a conventional operating system such as Windows, MacOS, Linux, or others; it may be a stripped down version of an operating environment such as a Java Virtual Machine or the like; or it may be a mobile operating system such as the Android Operating System from Google, the iOS from Apple, the Windows Phone from Microsoft or other mobile operating system. The operating system software 144 may include software routines that allow for the hosting and execution of one or more application programs or application software 146 such as event applications.

The application software 146 may include software that provides additional functionality to the media player device. In some embodiments, the application software 146 may include applications to provide games or other events such as those described herein. As described herein, application software 146 may be downloaded to the device such as via communication interface 140 (described below) or it may be preinstalled in memory of secondary display device 122.

As shown, the example secondary display device 122 includes a display 132. The display 132 may form part of the secondary display device 122, or it may be a separate hardware component that is connected to the secondary display device 122. For example, the display 132 may be a touch screen display, which is part of the iPad device.

The example secondary display device 122 also includes a processor 142 and memory 138. The memory 138 may include volatile memory such as some form of random access memory, and it may include non-volatile memory such as flash memory or a hard disk drive. The processor 142 may be a conventional central processing unit (CPU) such as those manufactured by AMD, and Intel, or it may be a specialized processor. The processor 142 may be configured to execute computer instructions from the operating system software 144, application software 146, or other software stored in the memory 204.

The secondary display device 122 may also include a communication interface 140. The communication interface 140 may take the form of a network interface chip or card and its corresponding driver software that allows the secondary display device 122 to communicate with external networks. For example, communication interface 140 can include communication interfaces to support communication protocols such as Bluetooth®, WiFi® or other wireless or wired protocols. The secondary display device 122 may further include a card reader or other memory device reader 136 capable of reading removable memory cards such as, for example, SD cards, thumb drives and the like.

Figure 3:
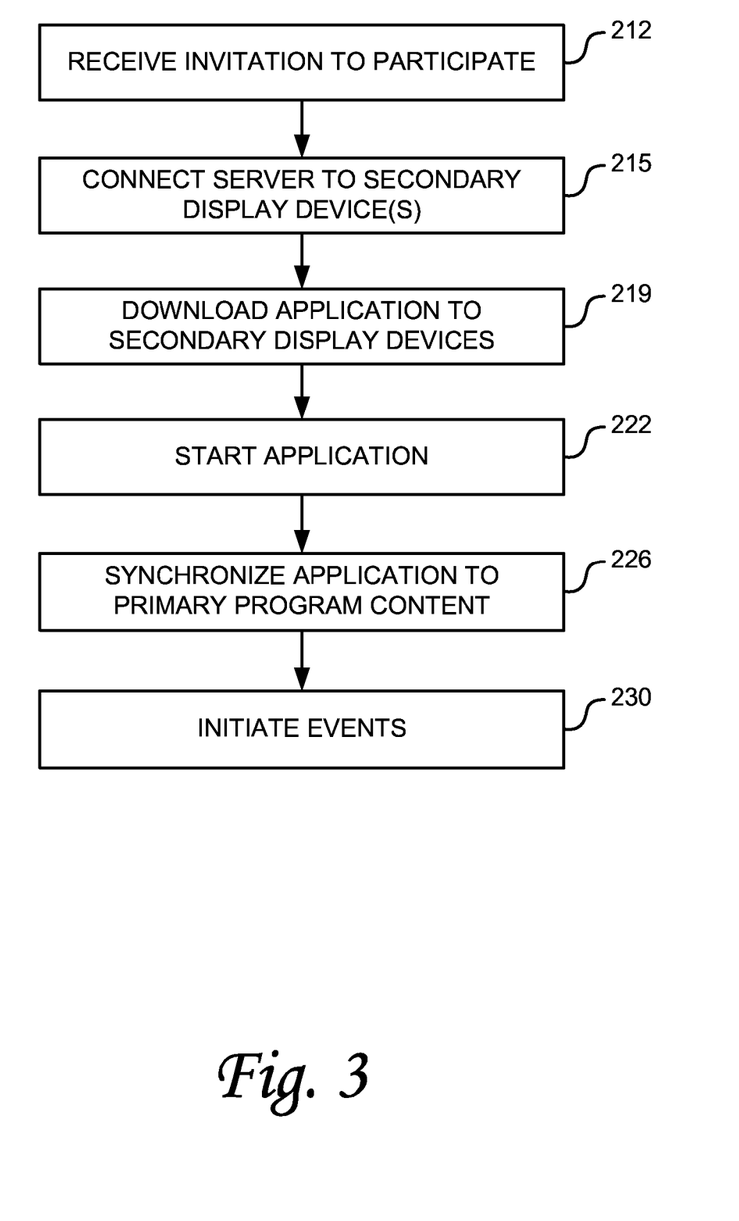
FIG. 3 is a diagram illustrating an example process for providing secondary content to one or more secondary display devices in accordance with one embodiment of the systems and methods described herein.

FIG. 3 is a diagram illustrating an example process for providing secondary content to one or more secondary display devices 122 in accordance with one embodiment of the systems and methods described herein. Referring now to FIG. 3, at operation 212 one or more viewers receive an invitation to participate in an upcoming program. For example, the invitation can be sent via email, SMS, MMS or other electronic delivery mechanism. As another example, an invitation for a future event may be sent to the viewer(s) of a current event by application server 128. For example, during movie previews, application server 128 might send the in-theater viewers an invitation to see an upcoming screening of the movie being previewed. As another example, the viewers might be prompted to enter information into their secondary display devices 122 indicating a level of interest in a movie being previewed. Application server 128 can be configured to provide invitations to viewers based on their level of interest.

As another example, a viewer may opt to purchase tickets and receive the tickets at secondary display device 122. For example, while watching a movie preview in the theater, the users may be given the option via their secondary display devices 122 to purchase tickets for an upcoming showing. The tickets and the application can be downloaded to the purchasing viewers' secondary display devices 122 immediately from application server 128, or at a later date (e.g., such as via the Internet). The viewer may also be given the option to purchase tickets as a gift for another, in which case the tickets can be sent directly to the recipient's secondary display device 122. As a further example, the viewer may win tickets to an upcoming showing of a feature film, and the tickets, or a certificate to be redeemed for tickets, sent to the viewer's secondary display device 122.

At the time for the showing, the viewer attends the program. For example, in terms of the in-theater experience, the viewer attends the designated movie in the designated theater. In one embodiment, the viewer brings his or her iPad or other secondary display device 122 to the theater. In other embodiments, the secondary display devices 122 are provided to the viewers. At operation 215, when in the theater, the user's secondary display device 122 connects to the application server 128. This connection can be established using a wireless connection, such as, for example, an IEEE 802.11 Wi-Fi network connection, a cellular (e.g., 3G or 4G) connection, or other communication connection. In other embodiments, the system can be configured to connect to the user's secondary display device 122 before the user enters the theater or screening room. For example, the system can be configured to connect to the user's secondary display device 122 while the user is in line for tickets or admission, while the user is in the lobby or the snack shop, or elsewhere in the vicinity of the theater. In one embodiment, connecting to the application server 128 can be accomplished using conventional network connection methods used with traditional Wi-Fi networks.

At operation 219, the application or applications (referred to simply as an application whether singular or plural) associated with the movie or other primary program content is downloaded to the viewer's secondary display device 122. In one embodiment, the application is downloaded from application server 128 to the secondary display device 122. In other embodiments, the application can be downloaded in advance of the viewer going to the theater such as, for example, via the Internet. Accordingly, in one example, application server 128 can be a server local to the theater and communicating with the secondary display devices 122 via a wireless access point in the theater vicinity. In another example, application server 128 can be a server that is not local to the theater and that communicates with the secondary display devices 122 via cellular networks, via an IP network and a wireless access point, or via another communication interface. In yet another example, application server 128 can be implemented using a combination of both local and remote components.

In some embodiments, the application downloads automatically upon connection to application server 128. In other embodiments, the viewer initiates the download. For example, upon connection to the application server 128, a splash screen or other screen may appear instructing the viewer to select a button for download. In other embodiments, a password or other key may be required to allow the user to access the network and download the appropriate application. In still other embodiments, the viewer may be asked to select the appropriate title or application for the movie that he or she is viewing. This can be useful, for example, in a multi-theater venue where multiple networks or multiple titles are playing simultaneously.

This can also be useful in embodiments where separate age-appropriate (or language-appropriate) secondary content is available. In such embodiments, the user may be prompted to enter the difficulty level or age range for the content. For instance, for some showings, different versions of the application may be available for multiple age groups. Each version of the application can have secondary content (e.g., games, contests, activities) geared toward the designated age level. For example, simpler games or easier-to-understand content may be provided in an application geared toward young children, while progressively more difficult games and more complex content are provided for increasingly older age ranges. In still other embodiments, rather than separate versions of the application, the application itself can be selectively set up by the viewer for age and difficulty levels.

At operation 222, the application is started. In some embodiments, the application starts immediately after the user enters the theater and downloads the application. As described in more detail below, in some embodiments, the viewers can compete or participate in events on an individual or team basis. Accordingly, in some embodiments, upon login and application download the viewers can be assigned a user number and can be assigned to a team. Team assignments can be made by application server 128, and can be made at random, by seating section, by viewer election, by gender, age and so on.

Although operations 212 through 222 are described in terms of the actions of a single viewer or secondary display device 122, they can be performed for multiple secondary display devices 122. In keeping with this, the remaining steps in FIG. 1 are described in terms of multiple secondary display devices 122.

At operation 226, the applications running on the secondary display devices 122 are synchronized to the primary program content. In one embodiment, a synchronization signal or signals can be provided by the application server 128 to the secondary display devices 122 and primary content delivery device 125 to synchronize them. In other embodiments, any one of these devices can be configured to synchronize with the others using communications over the network. In still other embodiments, audio synchronization can be used. For example, in one embodiment SmartSync Media Synchronization software, available from Audible Magic Corporation in Los Gatos, Calif., is used to synchronize the applications on the secondary display devices 122 to the primary program content being displayed by primary content delivery device 125.

In one embodiment, the secondary display devices 122 may have certain functions locked or disabled during the movie. Examples of functions that can be locked are the camera (to prevent users from recording the movie) and the cellular transceiver (to prevent users from making or receiving calls during the movie).

At operation 230, events and activities are initiated on secondary display devices 122. Because in some embodiments the devices are synchronized, the events and activities can be timed or triggered to occur in conjunction with related or relevant happenings in the primary content. For example, the receipt of a particular trigger signal by secondary display devices 122 can be used to initiate a predetermined event associated with that trigger. In some embodiments the trigger signals can be unique signals, each associated with a particular event. In other embodiments, the trigger signals can be the same or similar and the events programmed to initiate in sequence upon the receipt of each trigger signal.

In various embodiments, any of a variety of events and activities can be initiated including, for example, trivia and quiz games; skill games; coloring, art or other follow-along activities; sing-along activities; scavenger hunts; and so on. In addition, the viewers can be asked to predict various outcomes of the primary program content, vote for favorite characters or scenes, or vote for preferred endings. In some embodiments, where user votes or choices are requested, the results of these can be used to alter the primary program content. For example, alternative endings can be available and chosen based on user selections, character success or survival can be altered, and other options can be selected and implemented. While in some embodiments, such as motion picture applications, this may require the recording of multiple endings or multiple versions of a given scene, which can be a mechanism to stimulate return viewers.

Figure 4:
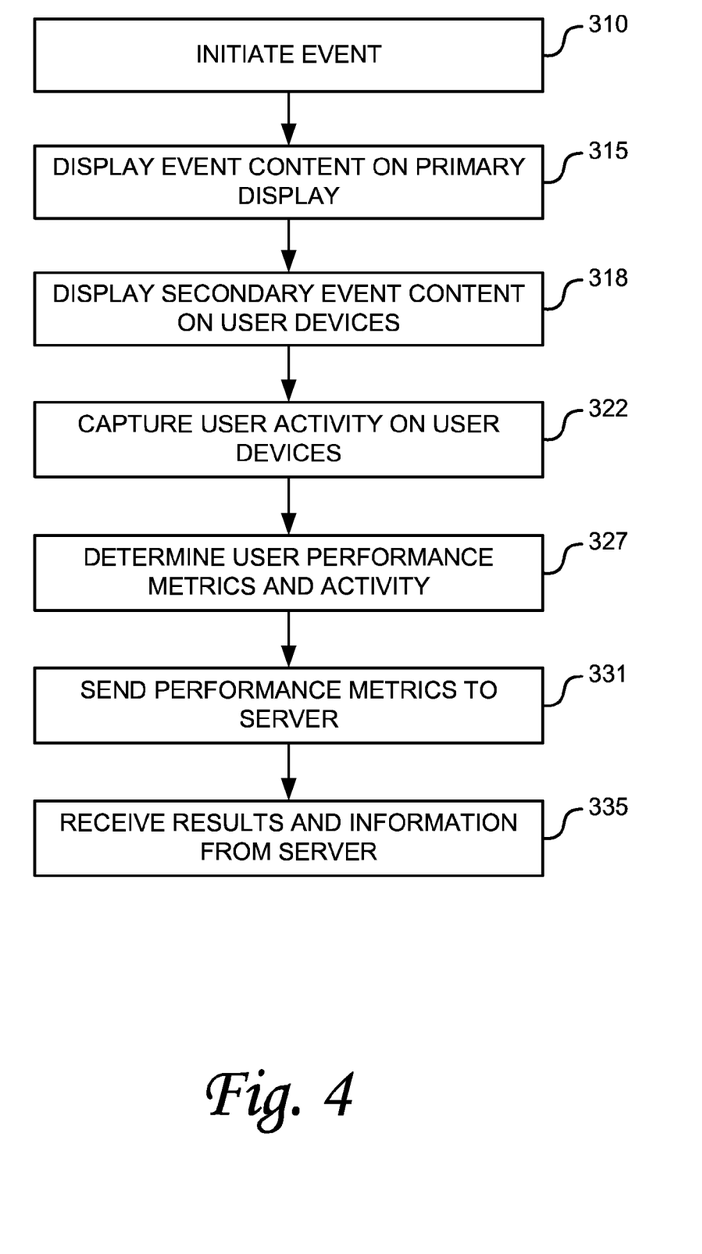
FIG. 4 is a diagram illustrating an example process for secondary content activities in accordance with one embodiment of the systems and methods described herein.

FIG. 4 is a diagram illustrating an example process for secondary content activities in accordance with one embodiment of the systems and methods described herein. Referring now to FIG. 4, at operation 310, an event is initiated. In some embodiments, the content is synchronized, and the event is triggered to initiate at a designated time, or upon the occurrence of a predetermined event, in the primary program content. For example, a particular game on secondary display devices 122 may be triggered at the beginning of a predetermined scene in the movie. By way of further example, a particular game to be played on secondary display devices 122 may have a theme or activity that corresponds to a particular scene in the movie. In this example, when the designated scene in the movie begins, the game is started. As another example, at the conclusion of a particular scene, a quiz corresponding to that scene or to happenings in the movie up to that point can be initiated. As yet another example, when a song is played in a movie, sing-a-long lyrics and graphics are initiated on the secondary display devices 122.

In other embodiments, the event initiated on secondary display devices 122 may be content that is not necessarily triggered by a particular event in the movie. For example, the event can be a user-initiated event that is made available by the application, but that does not necessarily correspond to a particular scene or event in the movie. Such events may be themed like the movie, but may be initiated and enjoyed upon viewer demand.

As described above, the event initiated on secondary display devices 122 can be based on an application that was downloaded to the secondary display devices 122 when the user logged onto the network in the theater, or in advance of the showing. In other embodiments, the event can be content that is streamed to the secondary display devices 122 in real time over the in-theater network, via the Internet, or from some other external source.

At operation 315, primary content delivery device 125 displays the primary content on primary content display device 126. In the context of synchronized events, a predetermined scene, action or other event in the primary content is displayed. In the context of the example of a motion picture, the event can be a particular scene in a movie, including audio and video for that scene, or a time or other event in the movie. For example, the event can be the performance of a song or musical number, a climax event (e.g., the capture of the 'bad guy'), a particular movie sequence (e.g., a chase scene) or other event.

At operation 318, secondary event content is displayed on secondary display devices 122. For synchronized events, the secondary event content may be content that corresponds to the primary content being contemporaneously displayed on primary content display device 126. In one embodiment, as described above, this secondary event content can be content generated by the application executing on secondary display devices 122. In terms of the example events described above, the secondary event content can include content such as gaming screens for gameplay; lyrics, notes and graphics for sing-a-long events; multiple-choice questions for quiz and trivia events; and the like.

Another type of secondary content for viewing on secondary display devices 122 can include a database of facts, trivia or other information relating to the movie. As a further example, this type of content can include database content of names, biographies and other information about the actors, actresses, director, etc.; film set location information; soundtrack information and so on. This content is an example of secondary content that might be synchronized to occur with the credits in the movie, or that might be called up by the user at any time before, during or after the movie. This content can be designed to provide information that the user can browse, and the system can also be configured to use the synchronization information to optimize this content. For example, synchronization can be used to tailor the information for a current scene. As a further example of this, where a particular scene includes certain actors and a song from the soundtrack; if the user selects the database content, the information provided can focus on the identity of the two actors in the current scene, the set and location for the current scene, and information about the audio track (artist, album, recording date, etc.) accompanying the current scene. Likewise, the content provided by the application can include links to external sites providing this information.

At operation 322, the secondary display devices 122 capture user activity for the event. For example, where the event is a game of skill, the secondary display devices 122 capture the appropriate gaming input, touchscreen or otherwise, by the viewer during game play. As another example, in a quiz game using multiple choice questions, the secondary display devices 122 capture the selections made by the viewer in answering the displayed questions. As yet another example, in a sing-a-long event, a microphone for the secondary display devices 122 may capture the viewers' vocal input.

For scorable or ratable events, the viewers' performance is measured during the event, and the information sent to application server 128. This is illustrated by operations 327 and 331. For example, in quiz or trivia games, the number of correct answered entered by a viewer are tallied. As another example, in skill games, the number and accuracy of 'hits' vs. misses are scored. As yet another example, game points may be awarded based on how quickly a player enters a correct answer: The faster a player answers correctly, the more points that player is awarded. In some embodiments, the performance measurement is performed by the application running on secondary display devices 122. In other embodiments, the metrics are sent to application server 128, and application server 128 performs the performance measurement.

The users' scores or other performance metrics are tallied and performance information is determined. For contests and games, high-scorers, top-performers and other winners can be determined on an individual and team basis. For example, in some embodiments the viewing audience can be divided into teams. Such division can be at random, by seating section, by user election, by gender and so on. Multiple different team designations can be made for a given showing and different team structures used for different viewer events. Additionally, there can be different team selections for different age groups.

For team events, team scores are tallied and the relative performances of the teams are determined. For individual events, individual scores are tallied and individual winners are determined. At operation 355, results are shared with the viewers on secondary display devices 122. Additionally prizes and other rewards can be sent to the winners' secondary display devices 122. Prizes can be virtual prizes such as tokens or virtual property for virtual worlds. Prizes can also be tangible prices such as free movie passes or concession discounts, cash or gift-card rewards, redeemable certificates, or other like rewards. The results can also be shown on primary content display device 126. For example, application server 128 can generate audio and video content announcing winners and prizes and provide this content for display on primary content display device 126. The content can be sent either directly to primary content display device 126, or to primary content delivery device 125 for ultimate display on primary content display device 126.

Figure 5:
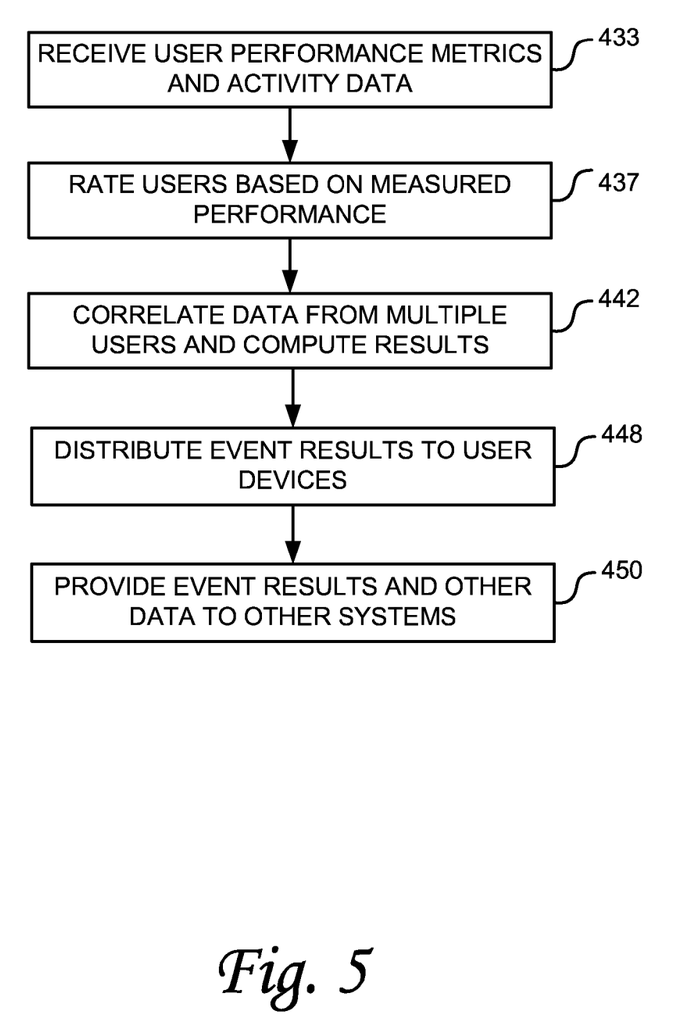
FIG. 5 is an operational flow diagram illustrating an example process for ranking or scoring results from viewer activities in accordance with one embodiment of the systems and methods described herein.

FIG. 5 is an operational flow diagram illustrating an example process for ranking or scoring results from viewer activities in accordance with one embodiment of the systems and methods described herein. The embodiments described with reference to FIG. 5, discuss scoring being performed by application server 128 in the in-theater environment. However, after reading this description it will be apparent to one of ordinary skill in the art how these embodiments can be implemented with scoring being performed by a different computing device and in different application environments.

Referring now to FIG. 5, at operation 433 application server 128 receives viewer performance metrics and activity data. At operation 437, application server 128 ranks the viewers based on their measured performance. In some embodiments, application server 128 receives raw data and computes each viewer's performance. In other embodiments, the scoring or other performance measurement is done by secondary display devices 122 and the performance results are sent to application server 128 for tabulation, correlation and ranking.

At operation 442, application server 128 correlates performance information from multiple viewers and determines the results of one or more events. For example, final scores of the various viewers participating in a given event are compared to determine a winner, or winners, of the one or more events. Likewise, overall scores can be tabulated to determine overall winners and team scores can be tabulated to determine winning teams. Different metrics can be used to determine one or more winners such as, for example, highest scores (e.g., first, second, third places; top-five participants or teams; and so on).

At operation 448, the results are distrusted for announcement to the viewers. For example, in some embodiments, application server 128 may deliver results to the viewers via secondary display devices 122. In further embodiments, application server 128 can provide results for display on primary content display device 126. Event prizes can also be distributed in a similar fashion. For example, electronic coupons or certificates can be delivered to the secondary display devices 122 of the winning viewers. At operation 450, the results can also be distributed to other systems or entities. For example, information about winning viewers can be provided to third-party or affiliate systems for prize distribution, record tracking or other purposes.

As described above, in various embodiments cues can be built into the primary content to trigger corresponding events or secondary content on secondary display devices 122. For example, in some embodiments, digital timestamps can be added to or built into the audio track for the primary audio content, and these digital timestamps can be detected by secondary display devices 122. Upon detection, the digital timestamp can be used to trigger the execution of a corresponding application or subroutine to initiate the event that corresponds to the scene in which the particular timestamp is placed. Likewise, other audio cues can be used to trigger the appropriate application corresponding to the then-current scene or primary content event. In addition to or in place of audio cues or timestamps, flags, semaphores or other markings can be included with the primary content and secondary display devices 122 or application server 128 can be configured to detect the presence of the flags. For example, a data stream associated with the primary content can be sent to application server 128 or secondary display devices 122 to detect the presence of flags indicating the initiation of a corresponding event. In still further embodiments, the synchronization can be time based such as by, for example, using a synchronized start time, and elapsed time counters to trigger corresponding events at predetermined times.

The examples described above included examples of games, contests, sing-a-longs and other events triggered during corresponding scenes of a movie. Such events can be configured to occur as the corresponding scene in the movie progresses or unfolds. Alternatively, in some embodiments the movie can be configured to pause at a predetermined frame for an event to occur. As one example, the primary content (movie in this example) can be configured to pause at a given frame so that the frame is displayed to the viewing audience. The corresponding event is triggered so the viewers can participate in the event using their secondary display devices 122. For example, in a scavenger hunt game, the secondary display devices 122 can display a copy of the still frame and a list of items that need to be found in the frame. Tapping a list item and its location in the frame allows the user to identify the item locations. As another example, for trivia contests, user votes, games or other events, it may be appropriate to pause the movie to provide the viewers with time to read the secondary content and make the appropriate entries. This can be useful to allow the user to participate in the event without missing scenes of the movie. This can be especially useful where quiz or trivia questions need to be read, or where the viewers are asked to vote on the next scene to be presented.

Figure 6:
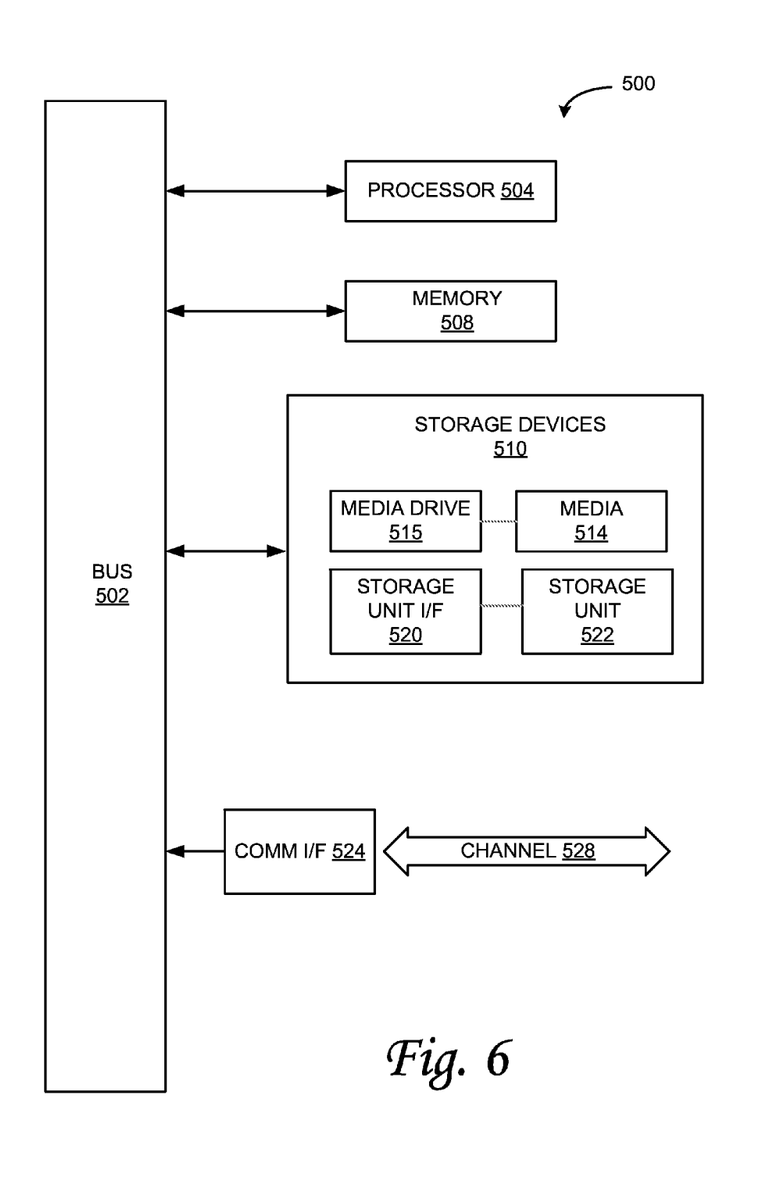
FIG. 6 illustrates an example computing module that may be used in implementing various features of embodiments of the systems and methods described herein.

In some embodiments, new character footage and character voices (animation or live-action) can be created and made to appear on the big screen, the secondary device, or both, thereby creating a new master of the original film that works in tandem with the secondary device. For example, the primary content may be augmented with additional graphics and footage to enhance the events. As a further example, more songs can be added to a movie to allow more sing-a-longs. As another example, alternative endings (or other scenes) can be included for selection based on viewer polling or scoring. As yet another example, additional frames can be added such as frames for scavenger hunt games, special splash screens for events, or for other screens for other event purposes. As a further example, new voices or scenes can be added to instruct viewers in the corresponding events.

Where components or modules of the invention are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 500. After reading this description, it will become apparent to a person skilled in the relevant art how to implement the invention using other computing modules or architectures.

Referring now to FIG. 6, computing module 500 may represent, for example, computing or processing capabilities found within desktop, laptop and notebook computers; handheld computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, main memory 508, storage unit interface 520, storage media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. In a motion picture theater, a process for providing interactive secondary content at a plurality of portable display devices, wherein the interactive secondary content is to be executed and displayed on the portable display devices, the interactive secondary content synchronized to a motion picture being shown on a main screen in the motion picture theater, the process comprising:
    delivering an application to the plurality of portable display devices, the application configured to execute interactive events on the portable display devices, wherein the interactive events comprise the interactive secondary content;
    displaying the interactive secondary content on the portable display devices, such that the interactive secondary content presents the interactive secondary content to a viewer, captures viewer input, and processes the captured viewer input, wherein at least a portion of the interactive secondary content originates with the motion picture and appears to flow down the main screen onto the portable display devices, and wherein the interactive secondary content comprises a game played solely on one or more of the portable display devices; and
    causing at least part of the interactive secondary content displayed on the one or more portable display devices to be temporally synchronized with one or more predetermined scenes in the motion picture, wherein the game is themed to correspond with the predetermined scenes in the motion picture.

2. The process according to claim 1, wherein delivering the application comprises communicatively coupling a server with the plurality of portable display devices and downloading the application to the coupled portable display devices.

3. The process according to claim 1, wherein causing at least part of the interactive secondary content displayed on the portable display devices to be temporally synchronized comprises transmitting a synchronization signal to the portable display devices, and wherein the process further comprises the application using information in the synchronization signal to trigger execution of a secondary-content event at a time synchronized with a corresponding event in the motion picture.

4. The process according to claim 3, wherein the synchronization signal comprises an audio signal.

5. The process according to claim 1, wherein the interactive secondary content displayed comprises one or more interactive screens to present the game to the viewers.

6. The process according to claim 1, further comprising determining viewer performance based on the processed viewer input.

7. The process according to claim 6, further comprising:
    ranking viewer performance for one or more of the interactive events; and
    sending results of the ranking to the portable display devices.

8. The process according to claim 1, further comprising automatically displaying on the portable display devices a notification about delivering the application to the portable display devices.

9. The process according to claim 1, wherein the portable display devices act as extensions of the main screen.

10. A system for delivering secondary content to a plurality of secondary content display devices in a motion picture theater, the system comprising:
    an application server configured to provide an application to the plurality of secondary content display devices, the application configured to execute interactive events on the secondary content display devices; and
    a primary content delivery device that provides a motion picture in the motion picture theatre;
    wherein the interactive events comprise interactive secondary content to be displayed on the secondary content display devices,
    wherein at least a portion of the interactive secondary content originates on the primary content delivery device and appears to flow down the primary content delivery device onto the secondary content display devices,
    wherein the interactive secondary content is configured to capture viewer input and to process the captured viewer input,
    wherein the interactive secondary content comprises a game played solely on one or more of the secondary content display devices,
    wherein the primary content delivery device and the application server are further configured to temporally synchronize at least a portion of the game with one or more predetermined scenes in the motion picture, and wherein the game is themed to correspond with the predetermined scenes in the motion picture.

11. The system according to claim 10, wherein the application server is configured to temporally synchronize the at least a portion of the game with the predetermined scenes by transmitting a synchronization signal to the secondary content display devices, and wherein the application uses information in the synchronization signal to trigger execution of a secondary-content event at a time synchronized with a corresponding event in the motion picture.

12. The system according to claim 11, wherein the synchronization signal comprises an audio signal.

13. The system according to claim 10, wherein the interactive secondary content displayed comprises one or more interactive gaming screens to present the game to one or more viewers.

14. The system according to claim 10, wherein the application server determines viewer performance based on the processed viewer input.

15. The system according to claim 14, wherein the application server ranks the viewer performance for one or more of the interactive events and sends results of the ranked viewer performance to one or more of the secondary content display devices.

16. The system according to claim 10, wherein the plurality of secondary content display devices are portable display devices, and wherein each of the secondary content display devices comprises:
- a display screen configured to display the interactive secondary content generated by the application; and
- a viewer input mechanism configured to accept the viewer input.

17. The system according to claim 10, wherein the secondary content display devices act as extensions of the primary content delivery device.

18. A process for delivering event content to a viewer, the event content accompanying a motion picture, the process comprising:
- displaying, on a portable display device, a notification about an application to be delivered to the portable display device;
- receiving the application at the portable display device;
- synchronizing the application to one or more predetermined scenes on a primary display in the motion picture, using a synchronization signal, wherein synchronizing the application comprises:
  - detecting a trigger in the synchronization signal; and
  - upon detecting the trigger, executing the application to initiate an interactive event in the portable display device at a time synchronized with a corresponding event in the motion picture;
- wherein the interactive event comprises event content to be displayed on the portable display device, wherein the event content comprises a game themed to correspond with one or more of the predetermined scenes, wherein at least a portion of the event content originates on the primary display and appears to flow down the primary display onto the portable display device, and wherein the interactive content captures viewer input on the portable display device and processes the captured viewer input.

19. The process according to claim 18, wherein the event content displayed comprises one or more interactive gaming screens to present the game to a set of viewers.

20. The process according to claim 18, further comprising determining viewer performance based on the processed viewer input.

21. The process according to claim 20, further comprising ranking the viewer performance and sending results of the ranking to one or more of the portable display devices.

22. The process according to claim 18, wherein receiving the application at the portable display device comprises receiving a version of the application, wherein the event content to be displayed is specific to the version of the application, and wherein the version of the application is specific to information provided by the viewer.

23. A computer program product for providing delivery of interactive content accompanying a motion picture being shown on a primary display, the interactive content comprising a game themed to correspond with the motion picture, the game comprising one or more interactive events, wherein the game is displayed solely on one or more portable display devices, the computer program product comprising a non-transitory computer useable medium having computer program code recorded thereon, the computer program code comprising one or more instructions for causing a processing device to perform the functions of:
- detecting a trigger in a synchronization signal;
- upon detecting the trigger, initiating one of the interactive events in one or more of the portable display devices at a time synchronized with a corresponding event in the motion picture, such that the at least a part of the interactive content is temporally synchronized with one or more predetermined scenes in the motion picture;
- receiving, by the interactive content, viewer input to the interactive content; and
- processing the viewer input to the interactive content;
- wherein at least a portion of the interactive content originates with the motion picture and appears to flow down the primary display onto the portable display devices.

24. The computer program product according to claim 23, wherein the interactive content displayed comprises one or more interactive gaming screens to present the game to a viewer.

25. The computer program product according to claim 23, wherein receiving the viewer input to the interactive content comprises modifying the timing of the corresponding event in the motion picture.

26. The computer program product according to claim 23, wherein the computer program code further comprises one or more instructions for causing the processing device to perform the functions of:
- assigning user numbers to the one or more portable display devices; and
- forming teams based on the user numbers assigned.

* * * * *